(12) United States Patent
Shiohara

(10) Patent No.: US 6,804,019 B2
(45) Date of Patent: *Oct. 12, 2004

(54) PRINT DATA GENERATION SYSTEM AND CORRESPONDING METHOD FOR USE WITH A PRINTING SYSTEM

(75) Inventor: Susumu Shiohara, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,953

(22) Filed: Jun. 8, 1998

(65) Prior Publication Data

US 2003/0011806 A1 Jan. 16, 2003

(30) Foreign Application Priority Data

Jun. 9, 1997 (JP) ............................................. 9-151412

(51) Int. Cl.[7] .............................................. G06K 15/00
(52) U.S. Cl. ................................. 358/1.15; 358/1.13
(58) Field of Search .............................. 358/1.15, 1.16, 358/1.14, 1.13, 1.12, 1.1–1.9, 1.11–1.8; 719/321–327

(56) References Cited

U.S. PATENT DOCUMENTS

| | | | | |
|---|---|---|---|---|
| 5,228,118 A | * | 7/1993 | Sasaki | ........................ 358/1.13 |
| 5,515,481 A | * | 5/1996 | Pardo | .......................... 345/506 |
| 5,559,933 A | | 9/1996 | Boswell | ....................... 395/114 |
| 5,580,177 A | * | 12/1996 | Gase et al. | .................... 400/61 |
| 5,604,843 A | * | 2/1997 | Shaw et al. | ................... 358/1.1 |
| 5,692,111 A | * | 11/1997 | Marbry | ...................... 358/1.15 |
| 5,699,495 A | * | 12/1997 | Snipp | ......................... 358/1.15 |
| 5,704,021 A | * | 12/1997 | Smith et al. | .................. 358/1.9 |
| 5,768,487 A | * | 6/1998 | LeClair et al. | .............. 358/1.17 |
| 5,784,177 A | | 7/1998 | Sanchez et al. | |
| 5,798,770 A | * | 8/1998 | Baldwin | ...................... 345/506 |
| 5,982,994 A | * | 11/1999 | Mori et al. | ................. 358/1.15 |

FOREIGN PATENT DOCUMENTS

| | | | |
|---|---|---|---|
| EP | 0521673 A2 | 6/1992 | ............. G06F/3/12 |
| JP | 6-214796 A | 8/1994 | |
| JP | 9-97141 A | 4/1997 | |
| JP | 7-13750 A | 1/1998 | |

* cited by examiner

Primary Examiner—King Y. Poon
(74) Attorney, Agent, or Firm—Sughrue Mion, PLLC

(57) ABSTRACT

A print data generation system is provided that is compatible with any of a plurality of printers of a printing network. A print driver of the print data generation system interprets configuration information indicating the processes required for using a particular selected printer, and loads the processes from a storage section to memory. The processes are then executed in the appropriate manner to render the print driver compatible with the selected printer. The print driver can thus be made compatible with any of the printers in the network by loading and executing the appropriate processes in the appropriate manner.

10 Claims, 8 Drawing Sheets

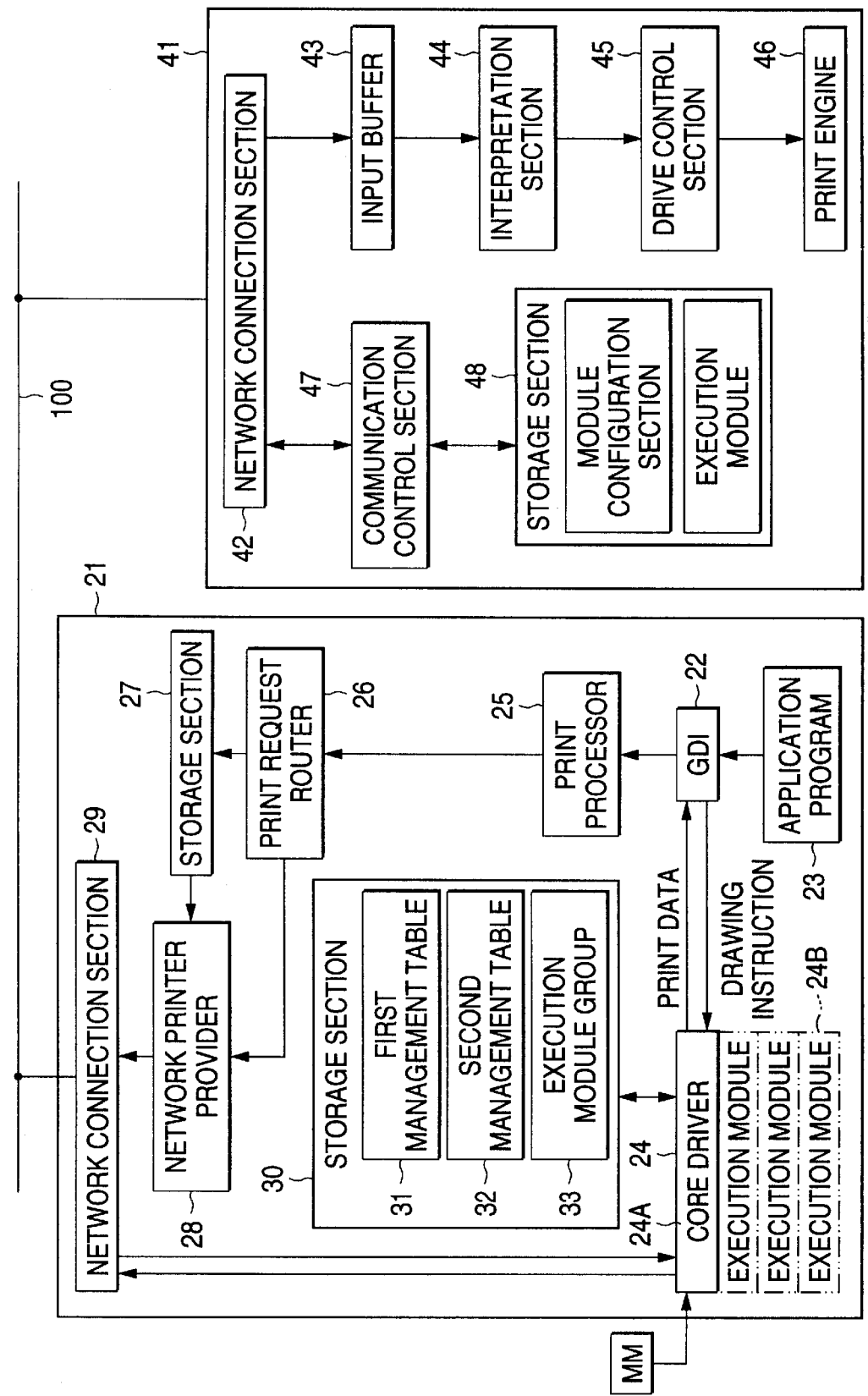

SECOND MANAGEMENT TABLE 32

| EXECUTION MODULE NAME | EXECUTION MODULE STORAGE ADDRESS |
|---|---|
| f1.dll | ADRf1 |
| f2.dll | ADRf2 |
| fn.dll | ADRfn |

PRINT DATA GENERATION SYSTEM AND CORRESPONDING METHOD FOR USE WITH A PRINTING SYSTEM

BACKGROUND OF THE INVENTION

1. Field of the Invention

The present invention relates to a system and corresponding method for generating data to control printing by any one of a number of printers in a printing network. More particularly, the present invention relates to a system and corresponding method which uses combinations of data generating programs to generate data for controlling any of a plurality of printers of a printing network which is configured, for example, as a local area network (LAN).

2. Description of the Related Art

Printing networks are known which comprise a plurality of printers and a plurality of host computers connected by a network, such as a LAN, so that the computers can share the printers. In this type of printing system, a user selects from among the printers on the network a desired printer appropriate for the type of data being printed. A printer driver related to the selected printer generates print data and transmits the print data to the printer, which prints the data in the appropriate manner.

The type of printing system described above has certain disadvantages. For example, the printers normally are in a one-to-one correspondence with the printer drivers, and thus must be configured for use with its respective printer in advance of printing, which requires considerable time and effort. Since numerous types of printers are now available, it is possible to incorrectly configure the printer driver for a particular printer if care is not taken.

In an attempt to mitigate this problem, printer drivers have been developed which are pre-configured to be compatible with different types of printers. To associate this type of printer driver with a particular type of printer in the network, that type of printer can be selected, for example, from a list of compatible printers provided by the driver. However, if a new printer which is not on the list of compatible printers is connected to the network as an additional printer or in place of an existing printer, the printer driver must be reconfigured to function with this new printer.

A continuing need therefore exits for a printing network having a plurality of printers that can easily be selected for printing, and to which additional printers can be added without the need for reconfiguring the print drivers to operate with the new printers.

SUMMARY OF THE INVENTION

An object of the present invention is to provide a system for generating print data in a manner compatible for use by a plurality of printers in a printing system.

Another object of the present invention to provide a print data generation system for use with a printing network comprising a plurality of printers, and which includes execution modules that generate print data compatible with the printers in the printing network.

These and other objects of the invention are achieved by providing a print data generation system, for use with a printer network including a plurality of printers, comprising a plurality of execution modules and a print data generator. Each of the execution modules includes data representing print functions of at least one printer that is selected from among the printers in the network. The print data generator is controlled to execute certain of the execution modules in association with each other to generate print data for printing by the selected printers in the network. Therefore, by executing the appropriate execution modules in the appropriate manner, the print data generation system is made compatible with any of the printers in the network.

The print data generator further comprises a module calling element which selects that appropriate execution module for execution based on module configuration information provided by the selected printers. The print data generator also includes a module configuration information requester which requests the module configuration information from the selected printers, and determinator which determines whether all of the necessary execution modules are registered with a management table. If some of the necessary execution modules are not registered, the requester obtains those of execution modules via the network. Alternatively, the print data generator generates the print data by executing only the registered modules, so that the selected printers print with limited print capability.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 2 is a more detailed block diagram of a printing system according to an embodiment of the present invention;

DETAILED DESCRIPTION OF THE PREFERRED EMBODIMENTS

Figure 1:
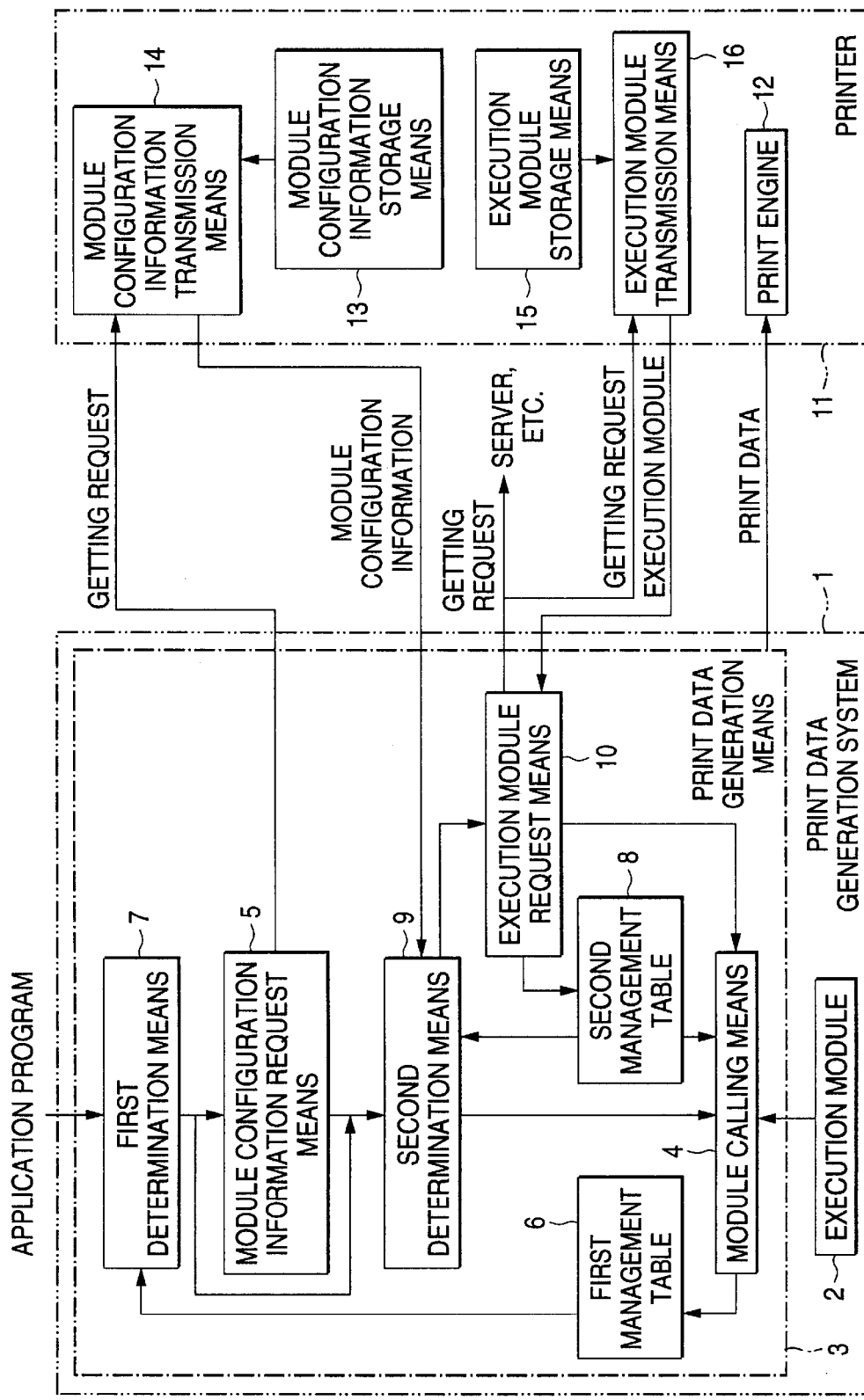
FIG. 1 is a functional block diagram illustrating certain functional components of a printing system according to an embodiment of the present invention.

FIG. 1 is a functional block diagram representing an example of a print data generating system according to an embodiment of the present invention. The print data generation system 1 comprises at least one execution module 2, which is an execution program that enables a printer to perform a particular print function, such as a color print function, a page print function, a high-density print function, a double-sided print function, and so on.

The print data generation system 1 further comprises a print data generator 3 which executes the appropriate execution modules 2 to generate print data for a particular printer. That is, the print data generator 3 executes only those execution modules necessary to generate the print data to be transmitted to a selected printer to control printing by that printer.

For example, a monochrome page printer requires the execution of a print function which generates data that controls the printer to print the print data in page format, and a monochrome image print function which generates data that controls the printer to print the data as monochrome characters. Therefore, when generating data to control a monochrome page printer, the print data generator 3 executes the execution modules necessary to create print data which controls the monochrome page printer to print monochrome print characters in page format.

The print data generator 3 includes a module calling element 4, a configuration information request element 5, a first management table 6, a first determinator 7, a second management table 8, a second determinator 9, and an execution module requester 10. The module calling element 4 calls for the execution of the appropriate execution modules 2 as required by the selected printer (e.g., printer 11) based on module configuration information corresponding to the selected printer 11, so that the called execution modules 2 are executed in association with each other to generate the print data to be transmitted to the selected printer 11.

For example, text data generated by an application program, such as a document preparation software program, is transmitted to a user-selected printer 11. Information indicating the execution modules 2 required for printing at the selected printer is contained in the module configuration information provided, for example, by the selected printer 11. The module calling element 4 calls the necessary execution modules 2 based on the module configuration information, and the print data generator 3 executes the called execution modules 2 to generate the print data. The print data is provided to the selected printer 11 to control the printer to print the text represented by the text data.

According to the invention, although the print data generator 3 has been made compatible with printer 11, the print data generator 3 does not assume a specific functional configuration until the printer 11 is selected. When the printer 11 is selected, the module calling element 4 of the print data generator 3 calls for execution of the execution modules 2 necessary to generate print data for controlling the selected printer 11. Therefore, by executing different execution modules 2 as appropriate, the print data generator 3 can generate different configurations of print data which is compatible with different types of printers in the inter network.

As mentioned above, the print data generator 3 further includes a configuration information request element 5 which requests (e.g., from the selected printer 5 or another source as discussed below) the module configuration information corresponding to the selected printer 11. If the module configuration information corresponding to the selected printer 11 is not provided, the configuration information request element 5 makes a further request for the module configuration information which identifies the execution modules 2 required for controlling the print functions of the selected printer 11.

For example, the configuration information request element 5 can control a display unit (not shown) to display a message indicating that the necessary module configuration information is not available, and requesting a user to enter the configuration information. Alternatively, the configuration information request element 5 can control the selected printer 11 to print a message requesting that the user provide the module configuration information for that printer 11.

The first management table 6 of the print data generator 3 manages the module configuration information, and the first determinator 7 determines whether or not the module configuration information corresponding to the selected printer 11 is registered in the first management table 6. If the first determinator 7 determines that the module configuration information is not registered, the configuration information request element 5 provides a request for the unregistered module configuration information to, for example, the selected printer 11.

That is, when the printer 11 is selected, the first determinator 7 references the first management table 6, and determines whether or not the module configuration information corresponding to the selected printer 11 is registered. If the module configuration information corresponding to the selected printer is not registered, the configuration information request element 5 communicates with the selected printer 11, and sends a request for the module configuration information to the printer 11. The new module configuration information returned from the printer 11 is registered in the first management table 6.

Therefore, it is not necessary to include the module configuration information in the print data generation system 1. Rather, if a new printer is connected to the network, or an existing printer is replaced with another printer, the necessary module configuration information for the new or replacement printer can be easily obtained from those printers in the manner described above. The module configuration information that has been obtained and registered with the first management table 6 can be read and interpreted when the new or replacement printer is selected for printing, and the necessary execution modules 2 can be called promptly.

The second management table 8 of the print data generator 3 manages the execution modules 2, and the second determinator 9 determines whether or not the execution module to be called is registered with the second management table 8. If the second determinator 9 determines that the execution module to be called is not registered, the execution module requester 10 provides a request for the unregistered execution module.

That is, the second determinator 9 references the second management table 8, and determines whether or not the execution module 2 indicated in the module configuration information has been provided. If the execution module 2 is not registered, the execution module requester 10 provides a request for the execution module 2 to, for example, the selected printer 11, or to another host computer, a server or a printer (all not shown) connected to the network. Once the requested execution module 2 has been obtained, it is registered with the second management table 8. Therefore, if a new printer is connected to the network, only unregistered execution modules need to be obtained in the manner described above.

Furthermore, if the second determinator 9 determines that the execution module to be executed has not been registered with second management table 8, instead of the execution module requestor 10 requesting that that execution module be provided, the module calling element 4 can call for execution only those execution modules 2 that have already been provided. By doing this, the selected printer 11 performs only the print functions designated by the available execution modules 2. Hence, the selected printer 11 can operate with limited print capabilities.

For example, if the selected printer 11 is capable of high-resolution printing but the execution module 2 required for generating high-resolution print data cannot be obtained, the high-resolution print function cannot be used. However, if an execution module 2 for generating low-resolution print data is obtained, the high-resolution printer can be used limitedly as a low-resolution printer. If a printer 11 capable of color printing is selected, it can also be used as a monochrome printer if an execution module for generating monochrome print data is provided. Thus, printer use efficiency can be enhanced by calling the execution modules 2 required for using the limited print functions of all print functions provided by the printer 11.

As further shown in FIG. 1, printer 11 includes a print engine 12 that is controlled to print based on the input print data, a module configuration information storage 13 for storing module configuration information containing information on execution modules required for the functions of the printer 11, and a module configuration information transmitter 14 for reading the stored module configuration information and transmitting it to the party requesting the module configuration information. The printer further includes execution module storage 15 for storing all or some of the execution modules, and execution module transmitter 16 for reading the requested one of the stored execution modules and transmitting that execution module to the party requesting the execution module.

As discussed above, the printer 11 stores information on the execution modules required for using the print functions provided by the printer as module configuration information. For example, if the printer 11 is newly connected to the network, each of the host computers (not shown) sharing the printer 11 makes a request forgetting the module configuration information.

In response to the information request, the module configuration information transmitter 14 reads the module configuration information from the module configuration information storage 13 and transfers the information to the requesting party, such as the host computer. Therefore, if the host computer, for example, does not previously obtain the module configuration information, the module configuration information is transferred from the printer 11 to the host computer, which then can use the printer 11. The print data input from the host computer is printed by the print engine 12.

Although the printer 11 comprises the execution modules required for using the print functions provided by the printer, the printer 11 need not comprise all necessary execution modules. If the host computer comprises standard execution modules, the printer 11 needs only to store certain execution modules. To effectively use the memory resources of the printer 11, it is preferable that the printer 11 store only some of the execution modules of all required execution modules. Upon receiving a request from the host computer for an execution module not existing in the host computer, the execution module transmitter 16 reads the requested execution module from the execution module storage 15, and provides the execution module to the host computer.

As discussed above, when a user selects the printer 11, the configuration information request element 5 of the print data generation system 1 sends a request for module configuration information to the selected printer 11. In response to the request, the module configuration information transmitter 14 reads the module configuration information from the module configuration information storage 13 and transmits the information to the print data generation system 1.

The module calling element 4 in the print data generation system 1 interprets the module configuration information input from the printer 11, and calls for execution the execution modules 2 indicated in the module configuration information. The print data generator 3 executes the called execution modules 2 to generate print data. The generated print data is transmitted to the printer 11, and is printed by the print engine 12.

Thus, the user needs only to previously relate the print data generator 3 to one or more printers 11. If one of the printers 11 is selected, communication occurs between the printer 11 and the print data generation system 1, and necessary execution modules 2 are called for execution to configure the print data generator 3 appropriately. Therefore, it is not necessary to previously relate the print data generation system 1 and a specific selected printer 11 to each other to achieve an optimum print data generation environment for the selected printer 11.

It is noted that a computer-readable recording medium in, for example, the host computer (not shown) can have a program stored thereon which causes the host computer to generate text data and selecting a printer 11 for printing in the manner described above. That is, the host computer can control access to the first management table 6 to determine whether module configuration information corresponding to the selected printer 11 is registered. The host computer can control the configuration information request element 5 to send a request for the module configuration information corresponding to the printer 11 to the printer 11 if it is determined that the module configuration information is not registered in the second management table 8. Also, if an unregistered execution module is required, the host computer can control the execution module requester 10 to provide a request for the unregistered execution module. The computer can further call the necessary execution modules for execution based on the module configuration information, to generate print data to be transmitted to the printer 11 from the print data generator 3.

A more specific description of a printing system according to an embodiment of the present invention will now be provided with reference to FIGS. 2–7.

As shown in FIG. 2, the printing system comprises a print data generation system 21 that includes a graphics device interface (GDI) 22, an application program 23, a printer driver 24 which includes a core driver 24A and an execution module section 24B, a print processor 25, a print request router 26, a storage section 27, a network printer provider 28, a network connection section 29, and another storage section 30 which stores a first management table 31, a second management table 32, and an execution module group 33 comprising a plurality of execution modules such as those described above. As described below in more detail, a personal computer, a workstation, or the like, is used as the print data generation system 21.

The graphics device interface (GDI) 22 is an application program interface (API) for executing data communication between an application program 23, such as a document preparation software program, and a printer 41 which is described in more detail below. The GDI 22 is operatively associated with a device independent bit map (DIB) engine (not shown) for generating image data.

The printer driver 24 generates print data to be output to the printer 41. The printer driver 24 is connected to the GDI 22 and converts image data into print data that can be interpreted by the printer 41 in response to a drawing instruction from the GDI 22.

As mentioned above, the printer driver 24 includes a core driver 24A whose function is essentially the same as that of the print data generator 3 shown in FIG. 1 as described above. The printer driver 24 further includes the execution module section 24B consisting of execution modules that are called by the core driver 24A. The core driver 24A calls for execution those execution modules specified by module configuration information that has been provided. The execution modules called for execution are included in the execution module group 33 of the storage section 30.

By executing these execution modules, the print data generation system 21 achieves a functional configuration compatible with the selected printer 41. Again, the core driver 22A itself does not perform a print data generation function, but rather calls for execution the necessary execution modules to properly configure the printer driver 24 for the selected printer.

The print data generated by the printer driver 24 is input via the GDI 22 to the print processor 25 via which the print data is input to the print request router 26. That is, the print processor 25 functions as a buffer for transferring the print data.

The print request router 26 routes the print data to its transfer destination. For example, the print request router 26 stores print data in a spool file in the storage section 27, or transfers the print data stored in the spool file to the network printer provider 28.

That is, the print request router 26 stores the generated print data in a spool file in the storage section 27 until the time to print the print data comes. The print request router 26 then transfers the print data in the storage section 27 to the network printer provider 28 together with the network address of the selected printer 41. The network printer provider 28 functions as an interface for transferring the print data to the network connection section 29, and thus the print data input to the network printer provider 28 is transmitted through the network connection section 29 to the selected printer 41.

The network connection section 29 is provided for two-way communication with the printer 41 over a communication line 100. Specifically, the network connection section 29 comprises protocols including TCP/IP (Transmission Control Protocol/Internet Protocol), and so on.

Figures 3A, 3B:
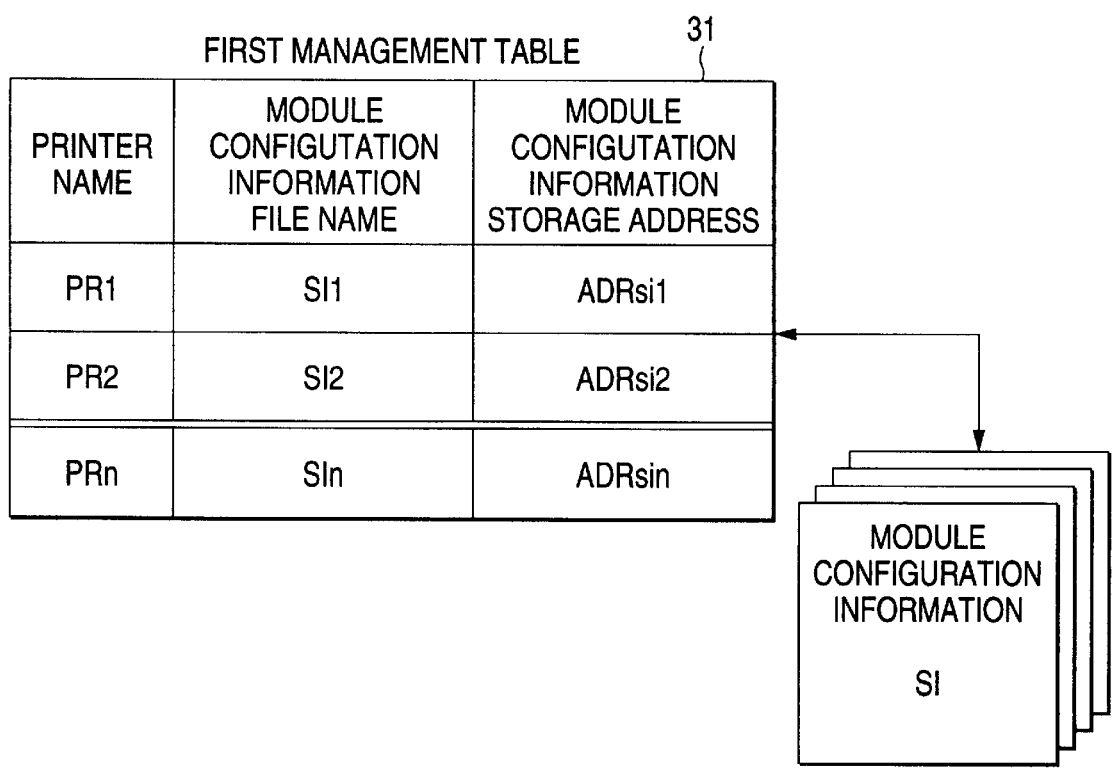
FIG. 3A is a schematic representation of a first management table employed by the printing system shown in FIG. 2.
FIG. 3B is a schematic representation of a second management table employed by the printing system shown in FIG. 2.

As described above, the storage section 30 stores a first management table 31, a second management table 32, and the above-mentioned execution module group 33 comprising a plurality of execution modules. As shown in FIG. 3A, the first management table 31 manages the names of printers connected to the communication line 100 (PR), the names of module configuration information corresponding to each printer (SI), and module configuration information storage addresses (ADRsi) in relation to each other.

As shown in FIG. 3B, the second management table 32 manages the execution module names and the execution module storage addresses in a one-to-one correspondence with each other. Therefore, the core driver 24A can detect the execution modules required for the selected printer by interpreting the user-selected module configuration information and calling the required execution modules from the execution module group 33 by referencing the second management table 32. The core driver 24A then loads the execution modules into the memory for configuring the optimum printer driver 24 for the printer.

As described above, the execution module group 33 is a module library storing a plurality of execution modules. The following execution module registration methods in the execution module group 33 are available.

In one example, only main execution modules are previously stored, and if any execution module other than the basic execution modules is requested, a new execution module is retrieved, for example, from resources on the network and is added to the execution module group 33. In this first method, the main execution modules are previously provided, so that the printer driver 24 corresponding to a general printer widely available can be configured promptly.

Alternately, no execution modules are previously stored in the execution module group 33, and only necessary execution modules are stored by retrieving them from, for example, resources on the network. In this second method, the execution modules are accumulated in response to the print environment that can be used by the user. Hence, unnecessary execution modules need not be stored, and the memory resources can be used efficiently.

Figure 4:
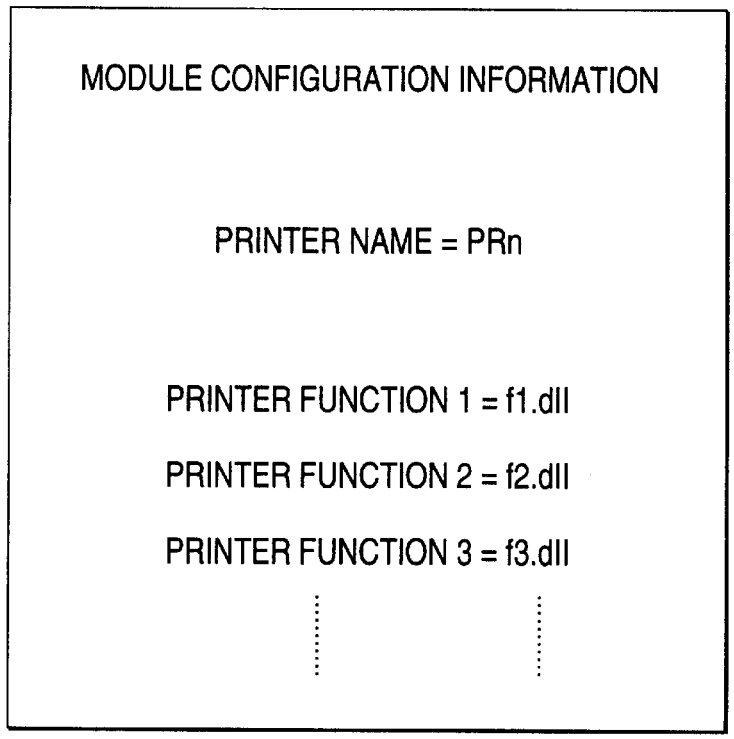
FIG. 4 is a schematic representation of module configuration data employed by the printing system shown in FIG. 2.

The module configuration information indicates information on the execution modules required for using various print functions of each printer as shown in FIG. 4, and acts as a design instruction of a specific functional configuration of the printer driver 24. The execution module names corresponding to the print functions are described in the module configuration information.

The print functions include, for example, a color print function, a page print function, a high-density print function, a double-sided print function, and so on. The print functions of each printer vary depending on the specifications of the printer. For example, a monochrome page printer has a print function in page units, a monochrome image data print function, and so on, and a color ink jet printer has a serial print function, a monochrome image print function, a color image print function, and so on.

As described above, the module configuration information indicates the execution modules for providing the print functions. The execution module is a program to use each print function. For example, to use the print function in page units, the execution module for generating print data in page units is required. To use the color image print function, the execution module for generating color image data is required.

The printer 41 shown in FIG. 2 will now be described. The printer 41 comprises a network connection section 42, an input buffer 43, an interpretation section 44, a drive control section 45, a print engine 46, a communication control section 47, and a storage section 48 described later. The network connection section 42 is provided for two-way communication with the print data generation system 21 over the communication line 100 in a manner essentially similar to that of the network connection section 29 of the print data generation system 21.

The input buffer 43 temporarily stores print data input from the print data generation system 21, and the interpretation section 44 interprets the print data and converts it into bit image data. The drive control section 45 controls driving the print engine 46 based on the print data. The print engine 46 forms dots, for example, on a print recording medium for printing. The print engine 46 can be a laser print engine, an ink jet print engine, a thermal transfer print engine, or any other type of print engine.

The communication control section 47 is provided for two-way communication with the core driver 24A, and is thus essentially similar in operation to the module configuration information transmitter 14 and execution module transmitter shown in FIG. 1. That is, the communication control section 47 transmits module configuration information in response to a request from the core driver 24A, and transmits execution modules in response to a request from the core driver 24A.

The module configuration information corresponding to the printer 41 and all or some of the execution modules specified by the module configuration information are stored in the storage section 48, which can include, for example, a flash ROM, a hard disk unit or the like. That is, the module configuration information stored in the storage section 48 contains information on the execution modules required for using the print functions of the printer 41.

The following two execution module storing methods in the storage section 48 are available.

In one method, all the execution modules required for the printer 41 are stored in the storage section 48. In a second method, only some of the execution modules required for the printer 41 are stored in the storage section 48.

In the first method, since all the necessary execution modules are stored, the printer does not depend on the contents of the execution module group 33 in the print data generation system 21. However, the memory consumption amount of the storage section 48 increases. In the second method, only some execution modules and preferably, only featured execution modules are stored. Thus, the memory consumption of the storage section 48 is decreased, although basic execution modules other than the execution modules in the storage section 48 need to be previously stored in the execution module group 33 in the print data generation system 21.

An example of the operation of the system shown in FIG. 2, for example, will be discussed with reference to FIGS. 5–7.

As described above, FIG. 5 is a flowchart illustrating a driver setting processing for relating the core driver 24A to the printer 41. In step S1, the user selects a desired network, and lists the printers connected to the network on a display unit, for example. Next, in step S2, the user selects a desired printer from among the listed printers based on the print contents and so on.

When the user selects, for example, the manufacturer name of the selected printer, printer drivers provided by the manufacturer are listed in step S3 on, for example, the display unit. Then, the user selects core driver 24A from among the printer drivers in step S4. In step S5, the user relates the printer selected in step S2 and the core driver 24A selected in step S4 to each other, and completes the driver setting processing.

As stated above, the core driver 24A is related to the selected printer in step S4. However, if the user precisely determines the printer driver related to the selected printer, the user need not select the core driver 24A. However, since the types of printer drivers cover a broad spectrum, it is difficult to relate a specific printer driver to a specific printer. Therefore, this determination can be avoided by specifying the core driver 24A.

Figure 5:
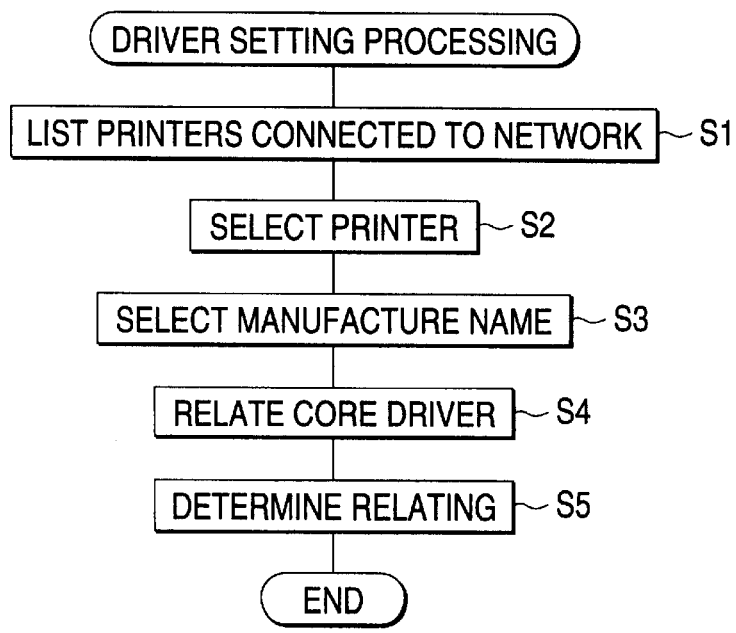
FIG. 5 is a flowchart illustrating an example of steps performed by the printing system shown in FIG. 2 to set the print driver of the system.

Furthermore, in the flowchart of FIG. 5, the printer is selected before the manufacturer name is selected. However, the invention is not limited to this order of operation. For example, a manufacturer name may first be selected, and the printers provided by the manufacturer may then be listed for selecting a printer from among the listed printers.

Figure 6:
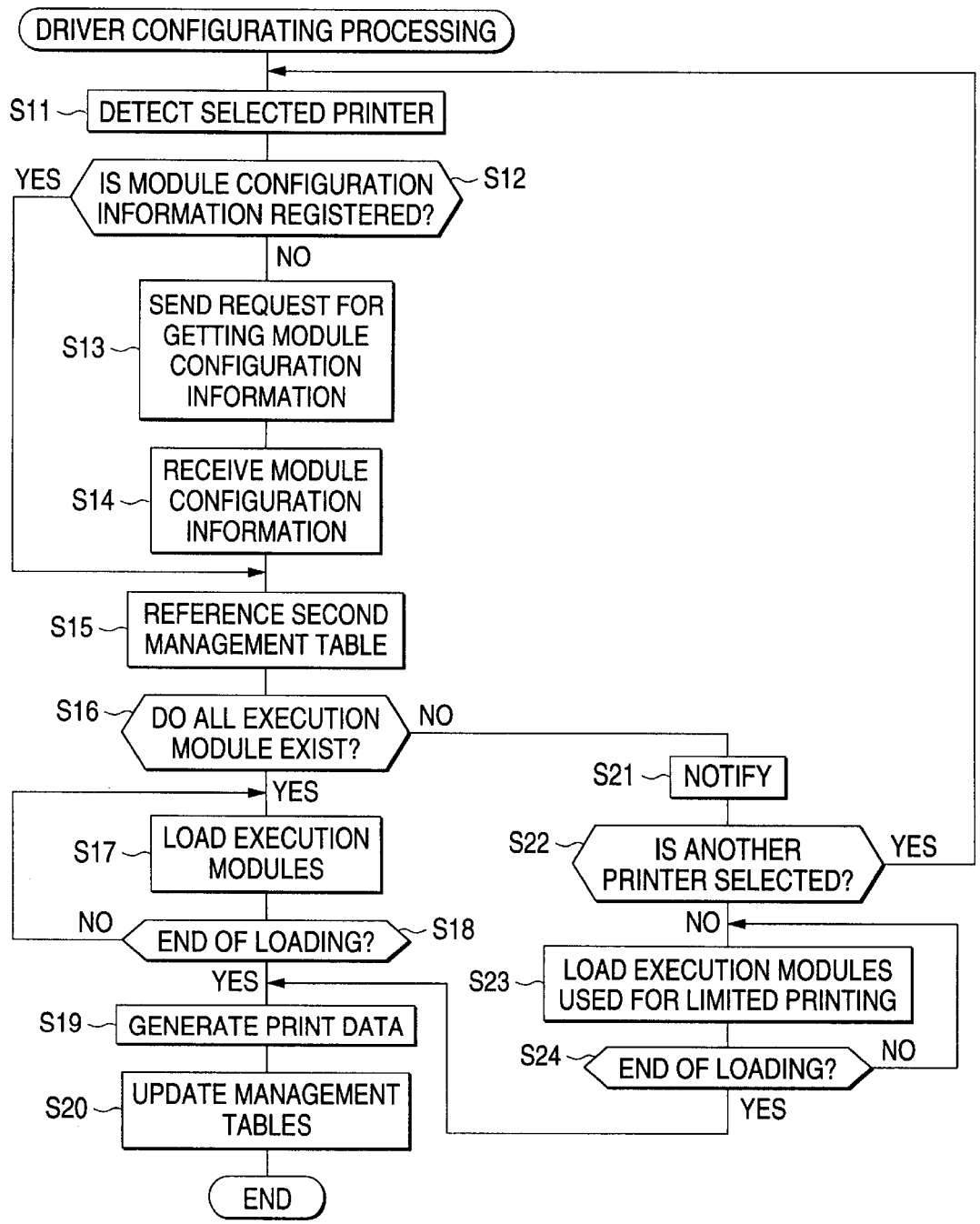
FIG. 6 is a flowchart illustrating an example of steps performed by the printing system shown in FIG. 2 to configure the print driver of the system.
Figure 7:
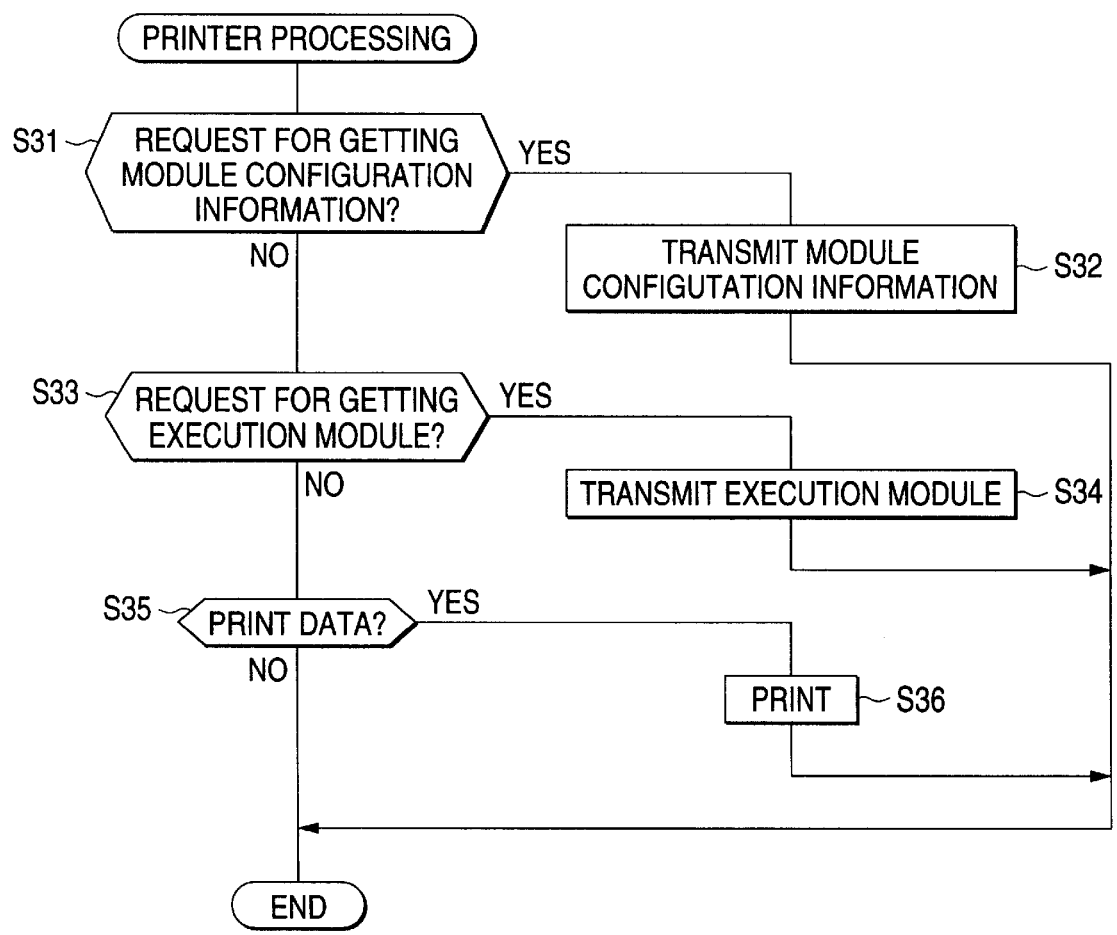
FIG. 7 is a flowchart illustrating an example of the steps performed by a printer in the system shown in FIG. 2.

FIG. 6 is a flowchart illustrating the process of configuring the printer driver 24 by the core driver 24A. When a print command is given, the core driver 24A detects the selected printer 41 in step S11. In step S12, the core driver 24A looks up the selected printer 41 in the first management table 31, and determines whether or not the module configuration information corresponding to the printer 41 is registered.

If the module configuration information of the selected printer 41 is not registered in the first management table 31, processing proceeds to step S13 at which the core driver 24A sends a request for the module configuration information to the printer 41. In step S14, the module configuration information returned by the communication control section 47 of the printer 41 in response to the module configuration information getting request is received.

On the other hand, if the module configuration information of the selected printer 41 is registered in the first management table 31, steps S13 and S14 are skipped.

The core driver 24A then searches the second management table 32 in step S15 based on the module configuration information, and determines in step S16 whether all the execution modules specified by the module configuration information are registered in the storage section 30.

If all the execution modules indicated in the module configuration information are registered in the execution module group 33, the indicated execution modules are loaded from the execution module group 33 to the memory in step S17. At step S18, a NO is returned until all the indicated execution modules are loaded. When all the indicated execution modules are loaded, YES is returned at step S18 and the printer driver 24 appropriate for the printer 41 is completed.

Print data is generated by the printer driver 24 configured for the printer 41 in step S19, and the management tables 31 and 32 are updated at step S20, whereby the new module configuration information received at step S14 is registered in the first management table 31. Therefore, if the printer 41 is again selected, the process of sending a request for getting the module configuration information is skipped.

On the other hand, if the execution modules indicated in the module configuration information are not complete in the execution module group 33, NO is returned at step S16. In step S21, the user is notified, for example, on the display unit, that unregistered execution modules exist among the necessary execution modules. At this step, the printers that can be used with the current execution module group 33 can also be listed in addition to the names of the unregistered execution modules.

Next, the core driver 24A determines in step S22 whether the user has selected another printer. If the user selects another printer, the processing returns to step S11.

However, if the user does not select another printer, the minimum necessary execution modules are loaded in step S23 from the execution module group 33 to the memory to use the first selected printer 41 for limited printing. When all execution modules used for limited printing at the printer 41 have been loaded into the memory, YES is returned at step S24 and processing proceeds to step S19. That is, for example, a high-resolution printer can be used as a low-resolution printer, a printer capable of color printing can also be used for monochrome printing. Therefore, if the user wants to use the first selected printer 41, the printer 41 is used within the range of the functions provided by the current execution module group 33, so that, for example, a printer near the user can be tried for printing.

Next, processing of the printer 41 will be discussed with reference to the flowchart shown in FIG. 7. When a signal is input from the print data generation system 21, it is determined in step S31 whether or not it is a request for module configuration information. If the signal is a request for module configuration information, the module configuration information is read from the storage section 48 in step S32 and is transmitted to the print data generation system 21.

If the signal is not a request for module configuration information, it is determined in step S33 whether it is a request for an execution module. If the signal is a request for getting an execution module, the execution module is read in step S34 from the storage section 48 and is transmitted to the print data generation system 21. Steps S33 and S34 are thus steps for covering a case where the core driver 24A retrieves an unregistered execution module on the network as described below.

If the signal is not a request for an execution module, it is determined in step S35 whether it is print data. If the signal is print data, the print engine 46 is driven for printing in step S36.

According to the embodiment described above, the following advantages are provided.

The core driver 24A calls necessary execution modules, thereby configuring the printer driver 24 fitted to the selected printer 41. Hence, it is not necessary to previously relate the printers and dedicated printer drivers to each other and operability and ease of use are improved drastically. That is, the core driver 24A, which does not comprise a real body as a printer driver, can be assigned to the printers connected to the network in common. Therefore, the user is relieved of complicated preparation work of assigning dedicated printer drivers to printers as in the related art.

In other words, the core driver 24A is a dummy printer driver which does not have a real body on the print data generation function, and the dummy core driver 24A enables driver setting work to be made hierarchical for omitting intricate setting work. This can be realized by using OLE (Object Linking and Embedding) technology developed by Microsoft Corporation USA, for example. In this case, the core driver 24A becomes an OLE client application and the execution modules become OLE server applications.

Furthermore, an optimum printer driver 24 is configured by combining the appropriate execution modules required for using the print functions. Therefore, a number of printer drivers can also share execution modules. For example, if a number of printer drivers 24 are started to execute a number of print jobs, the memory resources can be used efficiently.

Additionally, execution modules make up the printer driver 24. Thus, if change occurs in some print functions, only the execution modules corresponding thereto may be changed. Workability of program improvement is therefore enhanced.

Also, the module configuration information is stored in the printer 41 and is transferred in response to a request from the print data generation system 21, so that it need not previously be entered in the print data generation system 21 and a new printer connected to the network can be used easily. Since the module configuration information indicates necessary execution modules, the memory consumption amount lessens, and the transfer time taken to transfer the module configuration information to the print data generation system 21 is also short.

Furthermore, if the execution modules indicated in the module configuration information contain an unregistered execution module, the execution modules required for using the limited print functions of the printer 41 are called for configuring the printer driver 41. Hence, the printers connected to the network can be used efficiently, and ease of use is also enhanced.

In addition, newly obtained module configuration information is registered in the first management table 31. Therefore, when the printer is again selected, the printer driver 24 corresponding thereto can be configured promptly without communicating with the printer.

Another method of operation of the system shown, for example, in FIG. 2 will now be discussed with reference to FIG. 8. Members identical with those previously described above are denoted by the same reference numerals. The processing described with regard to FIG. 8 enables necessary execution modules to be retrieved from a network.

Figure 8:
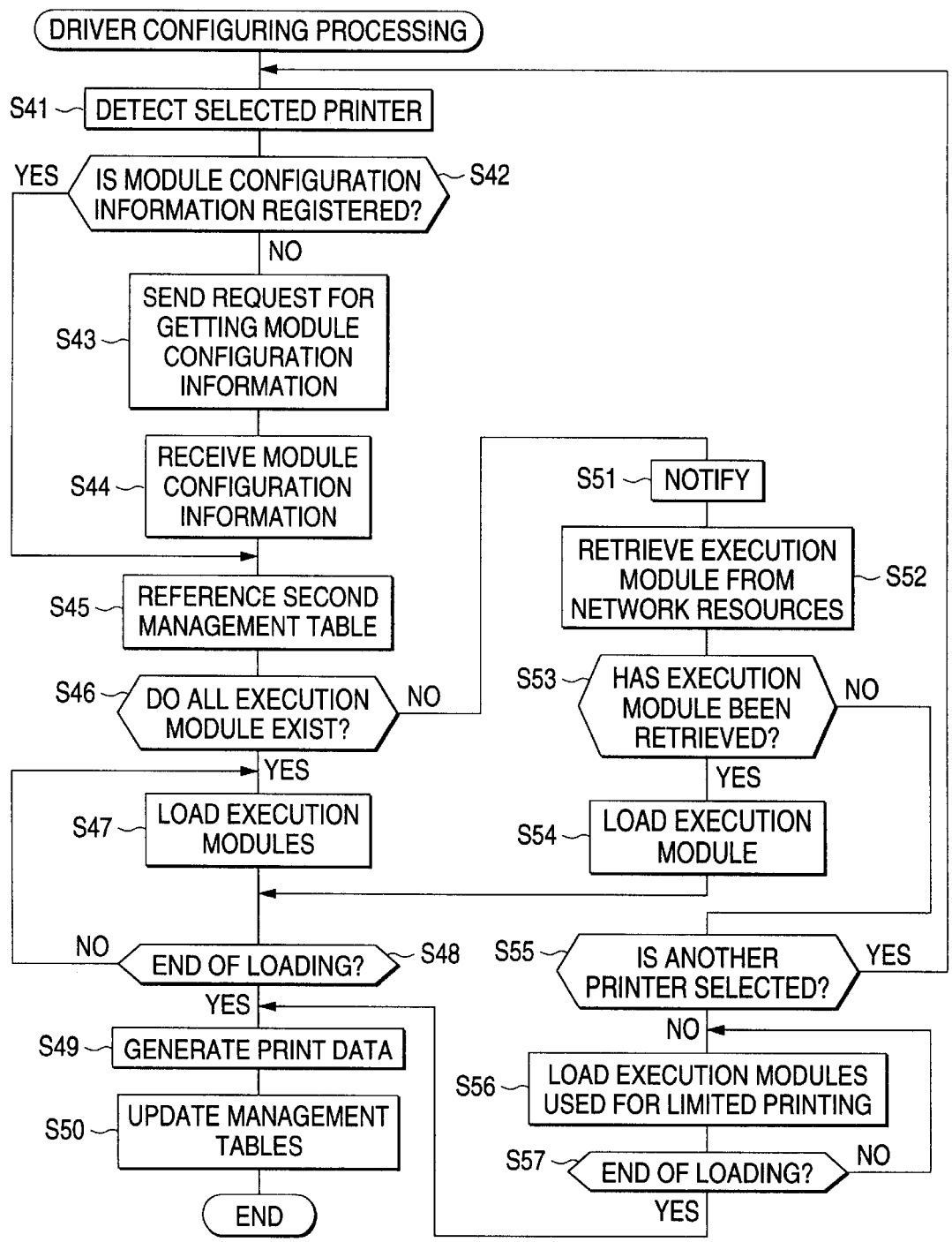
FIG. 8 is a flowchart illustrating another example of the steps performed the system shown in FIG. 2 for configuring a print driver of the system.

FIG. 8 is a flowchart illustrating driver configuring processing. Steps S41 to S50 are the same as steps S11 to S20 in FIG. 6 described above, and steps S55 to S57 in FIG. 8 are the same as steps S22 to S24 in FIG. 6. Therefore, these identical steps will not be discussed.

Assuming that the processing has been completed to step S46, if the execution modules indicated in module configuration information are not complete in a print data generation system 21, NO is returned at step S46 and processing proceeds to step S51. In step S51, the user is notified that unregistered execution modules exist as at step S21 in FIG. 6. In step S52, the unregistered execution modules are retrieved from resources on the network.

The resources on the network can be, for example, program storage resources of printers (also including selected printer 41), another print data generation system, a server, and so on, which are connected to the network. For example, the names of necessary unregistered execution modules are inquired of the resources by broadcasting, for example, whereby the presence or absence of the necessary execution modules and the storage locations thereof can be determined.

In step S53, it is determined whether the necessary execution modules have been retrieved from the resources on the network. If the necessary execution modules have been retrieved, they are downloaded in step S54. To load the remaining execution modules, the processing then proceeds to step S48. If a storage section 48 of the printer 41 previously stores execution modules as shown in FIG. 2, necessary execution modules can be transmitted from the printer 41 to the print data generation system 21. The new execution modules thus obtained are registered in a second management table 32 in step S50.

On the other hand, if some or all of the necessary execution modules cannot be retrieved from the resources on the network, it is determined in step S55 whether the user has selected another printer. If the user has not selected another printer, the execution modules required for using limited print functions are loaded from an execution module group 33 in steps S56 and S57 to configure a reduced-set printer driver 24.

The processing described above can also provide advantages similar to those of the processing described above with regard to FIG. 6. This processing also provides the following advantages.

If an unregistered execution module exists, it is retrieved from the resources on the network. Hence, the possibility that an optimum printer driver 24 can be configured is increased drastically.

Also, since unregistered execution modules are downloaded from the outside, featured execution modules are stored in the storage section 48 of the printer 41. Therefore, when the printer 41 is newly connected to the network, it can be used easily and promptly.

Another method of operation of the system shown, for example, in FIG. 2 will now be discussed with reference to FIG. 9. In this processing, a core driver is assigned to predetermined printers in common.

Figure 9:
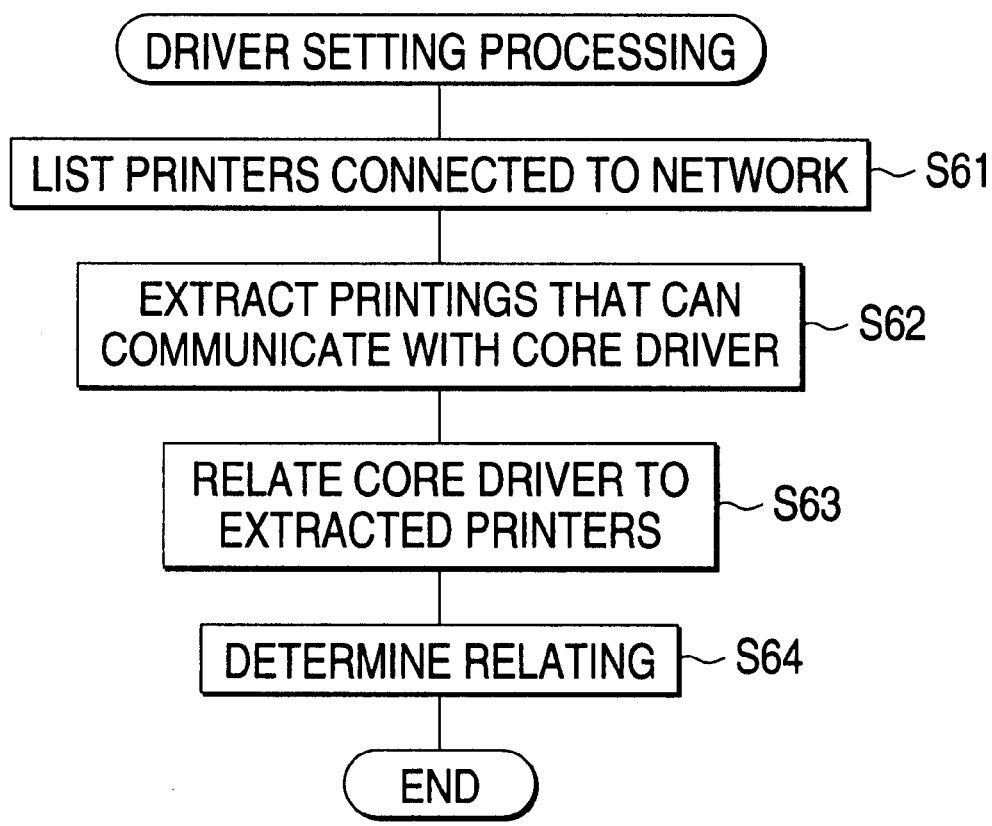
FIG. 9 is a flowchart illustrating another example of the steps performed by the system shown in FIG. 2 to configure the print driver of the system.

FIG. 9 is a flowchart illustrating a process for setting a driver. In step S61, printers connected to a network are listed on a display unit, for example, and only the printers that can communicate with a core driver 24A are extracted from the listed printers in step S62. This means that all printers that can respond to a request for module configuration information from the core driver 24A are extracted.

The core driver 24A is assigned to the extracted printers in step S63, and is made compatible with those printers in step S64.

The advantages provided by this processing are similar to those described above with regard to the processing shown in FIG. 5, for example. In addition, in the processing shown in FIG. 9, all printers that can be related to the core driver 24A are extracted, and the core driver is related to the extracted printers in unison. Therefore, the driver setting process is further simplified and ease of use is enhanced.

It should be understood by those skilled in the art that the foregoing description is preferred embodiments and that various changes and modifications may be made in the invention without departing from the spirit and scope thereof. For example, to notify the user that an unregistered execution module exists in step S21 (FIG. 6) or step S51 (FIG. 8), the user may be requested to install the unregistered execution module through the use of, for example, a floppy disk.

For instance, as shown in FIG. 2, a program for embodying the present invention can be recorded on a recording medium MM, and the recorded contents of the recording medium MM can also be loaded into the print data generation system 21. In addition to a physical recording media, such as floppy disk, CD-ROM, DVD-ROM, and memory card, a communication medium using a communication line for downloading can be used as the recording medium MM. Likewise, for the printer, the invention can be embodied by using a recording medium on which a predetermined program is recorded to load the program.

While the invention has been particularly shown and described with reference to preferred embodiments thereof, it will be understood by those skilled in the art that various changes in form and details may be made therein without departing from the spirit and scope of the invention.

What is claimed is:

1. A print data generation system, comprising:
    a set of execution modules available over a network, each including data representing a part of print functions of a printer driver; and
    a print data generator, controlled to execute certain ones of said execution modules in association with each other, to generate print data for printing by a printer, said print data generator comprising:
        a module configuration information requestor which obtains module configuration information from said printer;
        a module calling element which identifies said certain ones of said set of execution modules, needed to constitute a printer driver, based on said module configuration information from said printer; and
        a determinator controlling said module configuration information requestor to obtain via the network any of the execution modules indicated in the module configuration but not locally available to the print data generator.

2. A print data generation system as claimed in claim 1, wherein:
    said print data generator further comprises a management table which manages said module configuration information; and
    a said determinator makes a determination as to whether all of the certain ones of the set of execution modules are locally available by checking which execution modules are registered with said management table.

3. A print data generation system as claimed in claim 1, wherein:
    said print data generator further comprises a management table which manages said execution modules; and
    said determinator makes a determination as to whether all of said certain execution modules are locally available by checking which execution modules are registered with said management table.

4. A print data generation system as claimed in claim 1, further comprising:
    a management table of said print data generator, managing said execution modules;
    said determinator making a determination as to whether all of said certain execution modules are locally available by checking which execution modules are registered with said management table; and
    a module calling element controlling said print data generation system to execute those of said certain execution modules which are registered with said management table.

5. A method for generating print data, comprising:
    obtaining, from a printer, module configuration information representing characteristics of said printer;
    selecting certain ones of a set of execution modules, needed to constitute a printer driver, based on the module configuration information, each of said execution modules including program information;
    obtaining via a network any of the selected execution modules not locally available; and
    executing said program information in said selected execution module to generate print data for printing by said printer.

6. A method for generating print data for use by a printer, the method comprising:
    determining whether module configuration information representing characteristics of said printer has been provided;
    obtaining said module configuration information from said printer when said module configuration information is determined as not having been provided in the determining step;
    selecting for execution program instructions included in certain ones of a respective plurality of execution modules, needed to constitute a printer driver, based on said module configuration information; and
    obtaining via a network any of the selected execution modules not locally available; and
    executing said selected at least one program instruction to generate print data for printing by said printer.

7. A method as claimed in claim 6, further comprising determining that one of the selected execution modules is not locally available when the selected one is unregistered in a management table.

8. A printer for controlling the driving of a print engine, based on input print data, to control printing, said printer comprising:
    a module configuration information storage which stores module configuration information containing information pertaining to certain ones of a set of execution modules, needed to constitute a printer driver, each of said execution modules including data for executing a part of print functions of the printer driver;

a module configuration information transmitter which reads said stored module configuration information and transmits said read module configuration information to an entity requesting said module configuration information;

an execution module storage which stores at least one of said execution modules; and an execution module transmitter which reads at least one of said stored execution modules and transmits said read execution module to an entity requesting said read execution module.

9. A printing system comprising a print data generation system and a printing network comprising a plurality of printers;

said print data generation system comprising:

execution modules including information representing a part of print functions of a printer driver for at least one of said printers;

a print data generator which executes said information in certain of said execution modules to generate print data for printing by said at least one of said printers;

a module configuration information requestor which obtains, from said at least one printer, module configuration information corresponding to characteristics of said at least one printer;

a module calling element which identifies for execution said certain of said execution modules, needed to constitute the printer driver, based on said module configuration information; and a module for obtaining via a network any of the said certain execution modules not locally available;

and said printer comprising:

a module configuration information storage which stores said module configuration information; and a module configuration information transmitter which reading said module configuration information from said module configuration information storage and transmitting said read module configuration information to said print data generation system.

10. A computer readable medium of instructions for controlling a computer to control a printing system, said computer-readable medium comprising:

a data structure comprising instructions which controls the computer to select a printer for printing;

a data structure, comprising instructions, which controls the computer to determine whether module configuration information representing features of said selected printer has been registered with a management table;

a data structure, comprising instructions, which controls the computer to send a request to said selected printer to obtain the module configuration information corresponding to that printer when said module information is not registered;

a data structure, comprising instructions, which controls the computer to execute instructions included in certain ones of a set of execution modules needed to constitute a printer driver, based on the module configuration information, to generate print data for printing by said selected printer;

a data structure which controls the computer to reference a management table to determine, based on said module configuration information, whether any of said execution modules for execution is unregistered in said management table; and a data structure which controls the computer to obtain those of said execution modules that are unregistered prior to executing said execution modules;

wherein the execution modules each constitute only a part of said printer driver functions.

* * * * *